H. B. WILSON.
PROGRAM CLOCK.
APPLICATION FILED MAY 6, 1907.

917,394.

Patented Apr. 6, 1909.
5 SHEETS—SHEET 1.

WITNESSES:

INVENTOR
Harry B. Wilson
BY
Erwin & Wheeler
ATTORNEYS

H. B. WILSON.
PROGRAM CLOCK.
APPLICATION FILED MAY 6, 1907.

917,394.

Patented Apr. 6, 1909.
5 SHEETS—SHEET 3.

H. B. WILSON.
PROGRAM CLOCK.
APPLICATION FILED MAY 6, 1907.

917,394.

Patented Apr. 6, 1909.
5 SHEETS—SHEET 4.

WITNESSES:

INVENTOR
Harry B. Wilson
BY
Erwin E. Whaler
ATTORNEYS

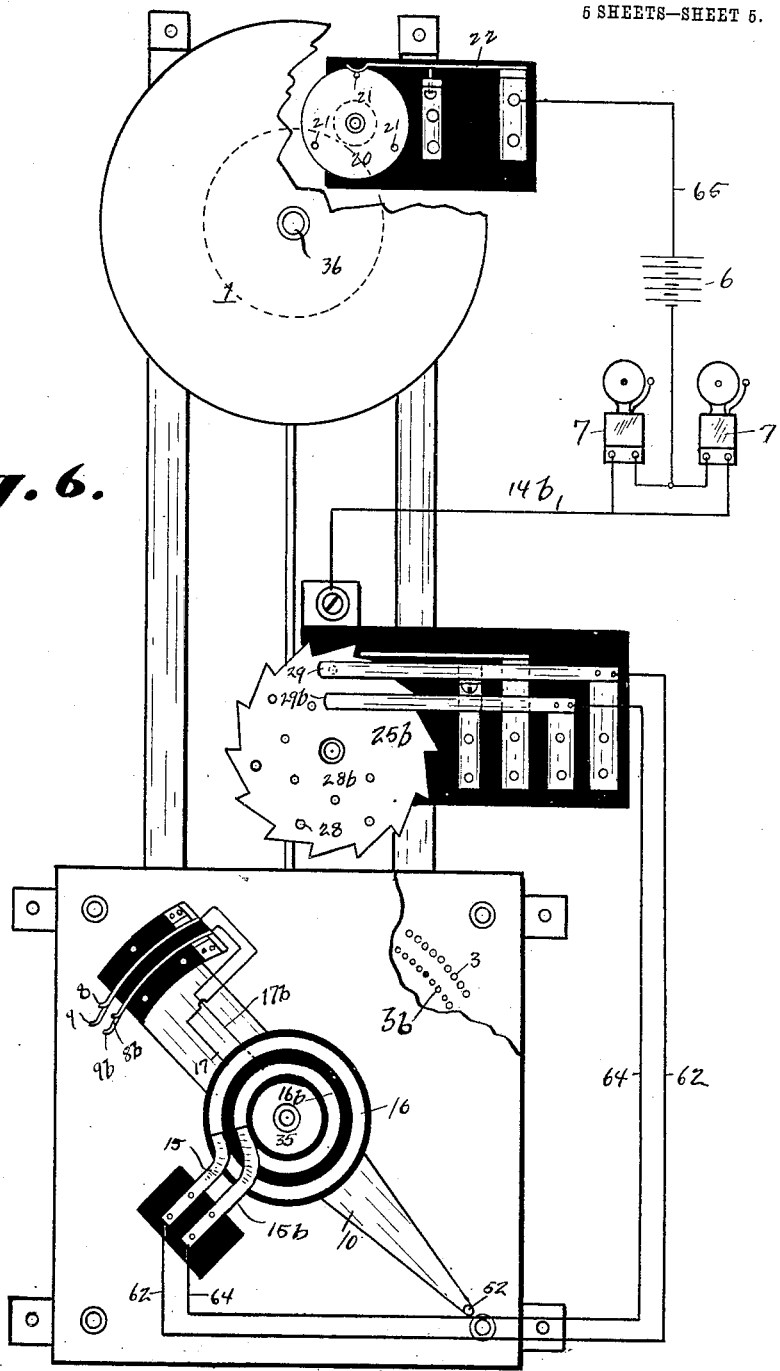

UNITED STATES PATENT OFFICE.

HARRY B. WILSON, OF MILWAUKEE, WISCONSIN.

PROGRAM-CLOCK.

No. 917,394.  Specification of Letters Patent.  Patented April 6, 1909.

Application filed May 6, 1907. Serial No. 372,191.

*To all whom it may concern:*

Be it known that I, HARRY B. WILSON, a citizen of the United States, residing at Milwaukee, county of Milwaukee, and State of Wisconsin, have invented new and useful Improvements in Program-Clocks, of which the following is a specification.

My invention relates to improvements in program clocks.

The objects of my invention are to provide a form of clock controlled mechanism in which electrical circuits through one or more sets of bells or other signals, may be closed by means of selective pins and differential brushes at short intervals and preferably in combination with a circuit breaker limiting the duration of the signal. Also to provide means for breaking the signaling circuit at specified intervals of varying duration; also for breaking a circuit through one set of signals and closing it through another set or at any desired intervals, contemporaneous, or in alternation; also to provide means whereby the signal controlling mechanism may be driven from an independent source of power, but controlled from a clock of ordinary type.

In the following description, reference is had to the accompanying drawings in which—

Figure 1:
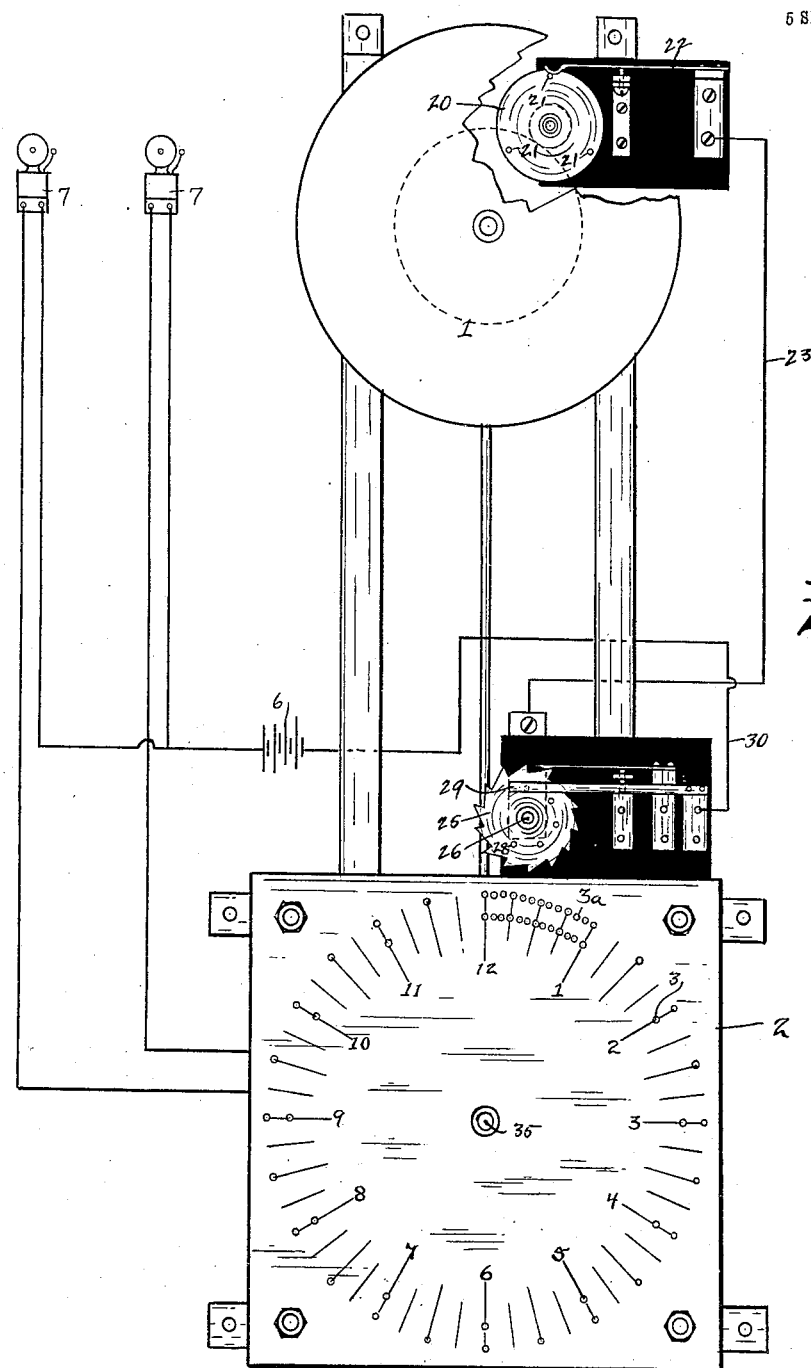
Figure 2:
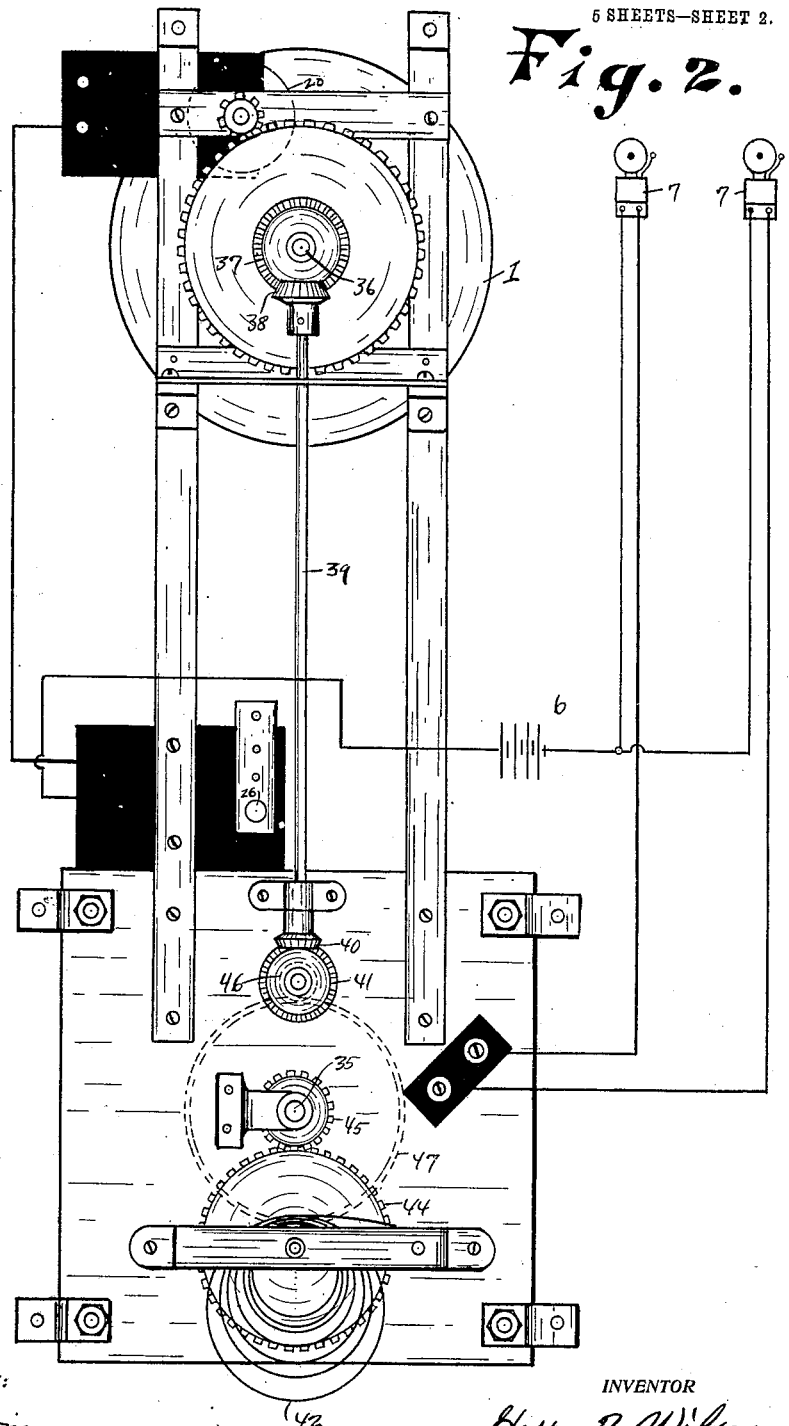
Figure 3:
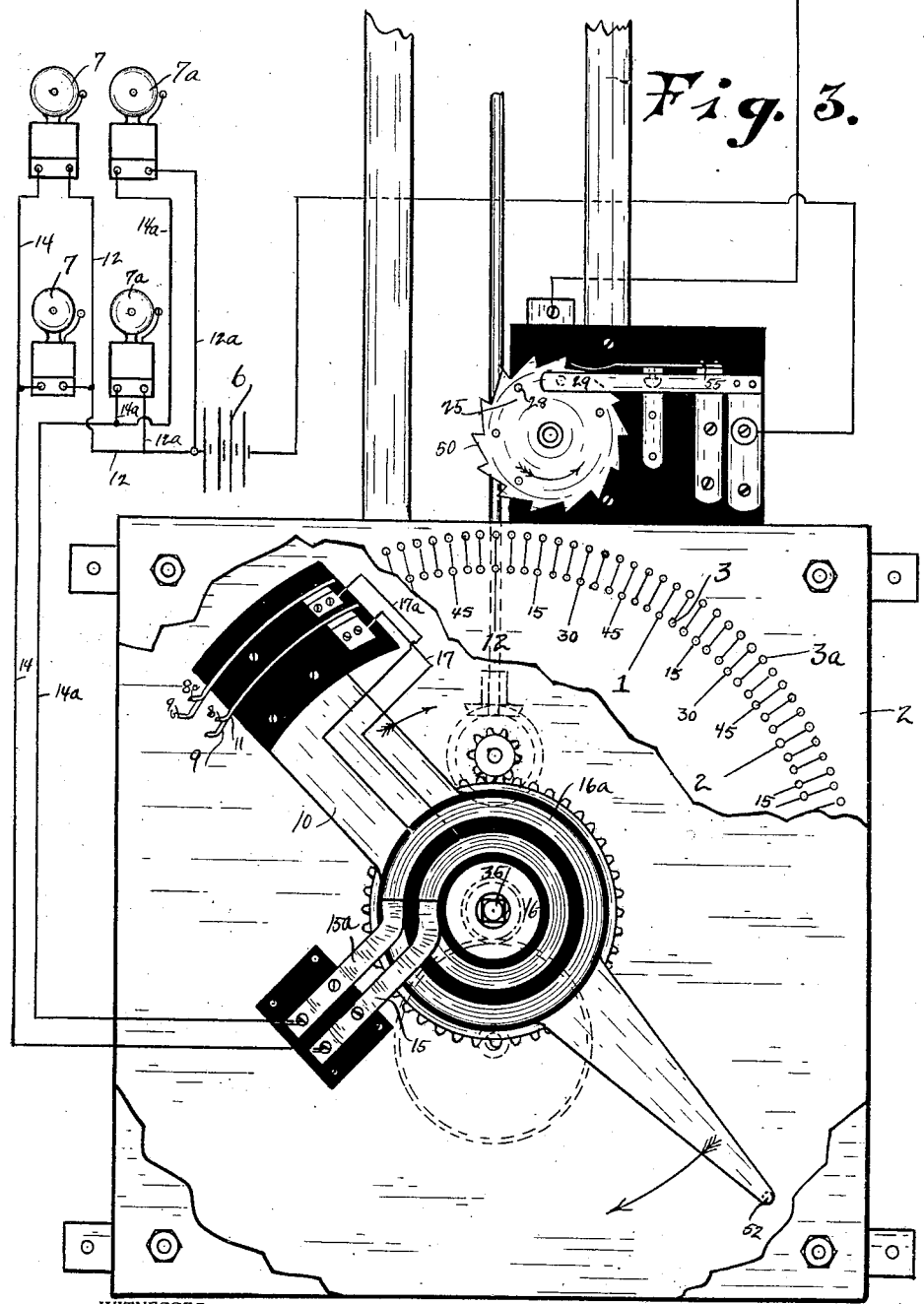
Figure 5:
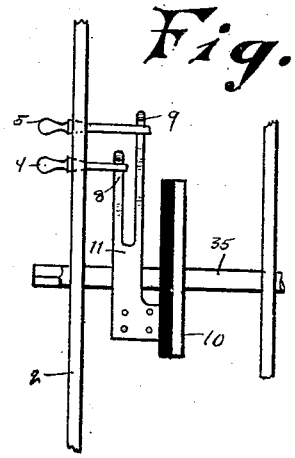
Figure 4:
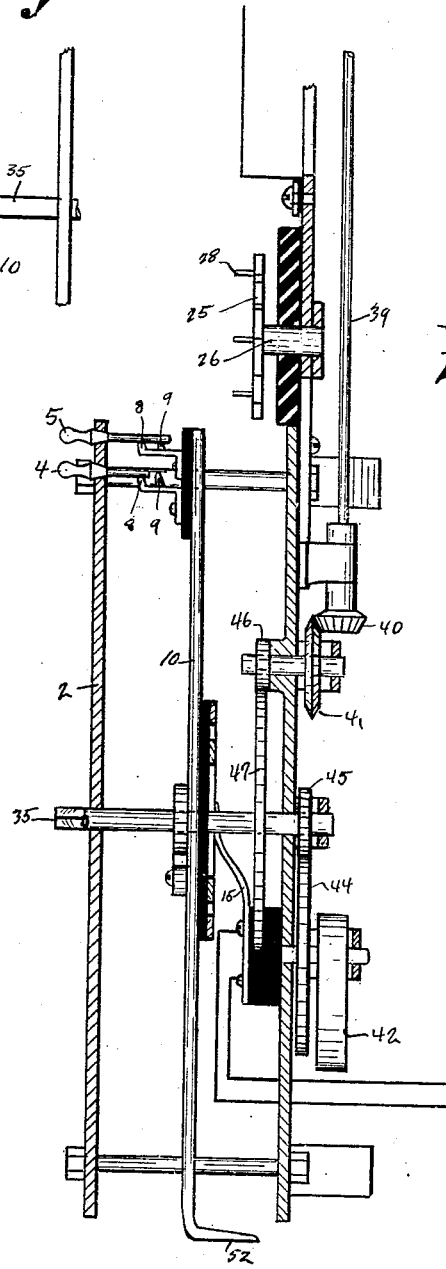

Figure 1 is a general front view of my invention with the clock partially broken away to show the signal limiting mechanism. Fig. 2 is a rear view. Fig. 3 is a view of the differential mechanism with the selective dial largely broken away. Fig. 4 is a vertical sectional view of the differential mechanism and circuit controller, with dotted lines indicating the position of the circuit closing pins when such programs are to be used in alternation or as day and night programs. Fig. 5 is a detail top view of a portion of the differential mechanism, illustrating the relation of the pins and brushes. Fig. 6 is a view similar to Fig. 3, showing an arrangement for providing alternate night and day programs.

Like parts are identified by the same reference characters throughout the several views.

1 is the dial of an ordinary clock and 2 is a selective dial provided with a circular row of holes 3 adapted to receive the selective contact plugs 4 and 5, the plugs 5 being longer than the plugs 4. The signals are electrically controlled. A battery 6 is employed in connection with a set of signaling bells 7, and the circuit of the battery through the bells is made and broken by three rotary circuit closers driven by the clock mechanism, and all three of which must be simultaneously in circuit closing position to sound the bells. One of these circuit closers is herein termed the differential circuit closer, and makes contact with the plugs. The position of the plugs on the dial regulates the time of contact. One of the other circuit closers is herein termed the signal limiting mechanism, this being arranged to close the circuit at that point momentarily and at short intervals, preferably twice while the differential circuit closer is traveling a distance equal to the space between two holes on the dial. The remaining circuit closer is herein termed the circuit controller, which moves step by step once during each revolution of the differential circuit closer, and closes the circuit at that point through long intervals, for example during the working hours, or from six o'clock a. m. to six o'clock p. m., the circuit being broken during the night or at non-working periods.

The circuit is closed through the plugs by means of the clock mechanism and differential brushes 8 and 9 mounted upon a rotary carrier 10, the brush 8 contacting with both the long and short plugs, while the brush 9 contacts only with the long plugs. The brushes constitute forked arms of a member 11, which is insulated from the carrier 10. The current from the battery 6 follows wires 12 to the bells 7 and then by wires 14, through a brush 15 to an insulated ring 16 on the carrier and from this ring to the member 11 through a conductor 17. The differential brushes 8 and 9 thus constitute terminals for this pole of the battery, and when either is in contact with a plug the current passes into the dial, and the clock frame, and then back to the battery through a signal limiting mechanism and a circuit controller whenever these are in circuit closing position.

By using a plurality of contacts 8 and 9, it is possible to shorten the interval between signals beyond the limit of practicability with pins alone. To avoid confusion and delay in removing and replacing pins in a dial of reasonable size, the pin receiving holes should represent not less than five minute intervals. If it be assumed that one long and one short pin occupy adjacent holes, then the contact 8 will operate two signals since it strikes both pins. The contact 9 will strike only the long pin and this may be made to take place at any desired interval between or after the signals produced by the member 8, thus multiplying the number of possible signals without increasing the number of dial apertures.

The signal limiting mechanism comprises a rotary member 20, driven from the clock mechanism, and provided with pins 21, which are so arranged as to contact successively and momentarily with a resilient electrode 22 at short intervals (preferably two and one-half minute intervals,) and when this contact is simultaneous with a differential brush and pin contact, the current flows from the frame through the electrode 22 and a wire 23 to the rotary circuit controlling member 25 which is insulated from the frame. The current enters this member through its supporting shaft 26. The member 25 is provided with segmentally arranged pins 28 which may be brought into contact successively with a resilient contact arm 29, and when in contact, permit the current to flow from the pin through the arm 29 and a wire 30 back to the battery, thus completing the circuit.

Where two programs are to be controlled, the second program is indicated by signal bells 7$^a$ connected with the battery by wire 12$^a$, with the current flowing through wire 14$^a$, brush 15$^a$, ring 16$^a$ on the carrier, and wire 17$^a$ to differential brushes 8$^a$ and 9$^a$, the dial being provided with a second row of holes 3$^a$ to receive the plugs 3 or 4, and support them in the paths of these brushes. The return circuit through these pins is the same as that through the brushes 8 and 9. The rings 16 and 16$^a$ may be mounted on either side of the carrier, the brushes 15 and 15$^a$ being correspondingly located either to the front or rear.

The carrier 10 is mounted on a shaft 35, and the arbor 36 of the minute hand of the clock is connected with the shaft 35 through the gear wheels 37 and 38, vertical shaft 39 gear wheels 40 and 41, 46 and 47. An auxiliary spring 42 aids the clock in driving the carrier through the gear wheels 44, and 45. The clock is of course provided with the usual escapement which controls the movement of the carrier, the connections being such that the carrier rotates once in twelve hours in synchronism with the movement of the hour hand of the clock.

The circuit controlling member 25 is provided with peripheral teeth 50, these being spaced at one half the distance between two adjacent pins 28 in the segmental row on this member. The member is rotated step by step at twelve hour intervals by means of an arm 52 on the carrier, which contacts with one of the teeth 50 once during each carrier revolution. The arrangement is such that the member 25 will be advanced one step at 6 a. m. and another at 6 p. m., the first of these steps bringing a pin 28 to arm 29 and the second advancing such pin and bringing the member halfway to the position of next pin contact.

55 is a resilient stop adapted to bear upon and between the teeth 50 and prevent over-rotation of the member 25. The pins have been referred to as segmentally arranged. As the successive teeth 50 represent twelve hour intervals in a step by step movement (the carrier requiring that interval for one rotation), it is obvious that the pins 28 represent full day intervals. The clock illustrated is designed for school programs and the pins representing Saturday and Sunday are therefore omitted and the circuit remains broken from six o'clock p. m. Friday, to six a. m., Monday.

Referring to Fig. 6 it will be observed that a rotary circuit controlling member 25$^b$ is provided with two segmental rows of contact pins 28 and 28$^b$ and two sets of contact arms 29 and 29$^b$. The pins 28$^b$ occupy radii on the member 25$^b$, midway between those occupied by the pins 28 and when the member 25$^b$ moves one step from contact between a pin 28 and the arm 29, it brings the pin 28$^b$ to arm 29$^b$. The next step brings a succeeding pin 28 to arm 29, the circuit being thus alternately established, first through one arm and then through the other. Where this arrangement is employed, the second row of holes 3$^b$ on the dial are used for the night program and the arms 29 and 29$^b$ are connected by wires 62 and 64 with the brushes 15 and 15$^b$ respectively. The wire 14$^b$ leads to the member 25$^b$ instead of connecting with the brush 15, and the current flows from the battery to the bells, the member 25$^b$, the pin in contact with one of the arms 29 or 29$^b$, thence by wire 62 (or 64) to the brush 15 (or 15$^b$) and thence through the corresponding ring 16 (or 16$^b$) wire 17 (or 17$^b$) and differential brushes 8 and 9 (or 8$^b$, 9$^b$). Its path from any one of the brushes follows a contacting pin to the frame and the signal limiting member 20 to the electrode 22, and then by a wire 65 directly back to the battery. In this manner two alternate programs are signaled by a single set of bells. The object of making the return connection from the bells directly to the member 29$^b$ is to have this member direct the current either to the day program as represented by the pins in the holes 3, or to the night program as represented by the pins in the holes 3$^b$.

Having thus described my invention what I claim as new and desire to secure by Letters Patent is,

1. In a device of the described class, the combination of a clock mechanism and a normally open signaling circuit, of a dial, a rotary device adjacent to the dial, a plurality of circuit closers thereon located at different distances from the dial, contact devices of unequal length adapted to be removably connected with the dial, some of said contact devices being adapted to project across the paths of each of the circuit closers, and others of said contact devices being adapted to extend across the path of a less number of circuit closers.

2. In a device of the described class, the combination with a clock mechanism and a normally open signaling circuit, of a dial provided with a series of perforations, a rotary device adjacent to the dial and provided with a plurality of circuit closers located at different distances from the dial, a set of contact plugs of different lengths, each adapted to fit the perforations in the dial, some of said plugs being of insufficient length to reach all of the circuit closers, together with an auxiliary circuit closer driven by the clock mechanism and arranged to make and break the circuit at regular intervals.

3. In a device of the described class, the combination with a clock mechanism and a normally open signaling circuit, of a dial provided with a series of perforations, a rotary device adjacent to the dial and provided with a plurality of circuit closers located at different distances from the dial, a set of contact plugs of different lengths adapted to fit the dial perforations, the shorter plugs being adapted to project into the path of one of said circuit closers, and the longer plugs being adapted to project into the path of more than one circuit closer, together with a rotary circuit controller provided with contact arms at irregular intervals segmentally disposed and adapted to be actuated step by step at regular intervals from said rotary device adjacent to the dial.

4. In a device of the described class, the combination with a clock mechanism and a normally open signaling circuit, a dial provided with a series of perforations, a rotary device adjacent to the dial and provided with a plurality of circuit closers located at different distances from the dial, a set of selective contact plugs of different lengths adapted to enter said perforations and project into the paths of the circuit closers, some of said plugs being of insufficient length to reach all of said circuit closers, and a rotary circuit controller provided with segmentally arranged circuit closing arms, and means for actuating the circuit controller step by step at regular intervals, said arms being arranged to constitute terminals for said signaling circuit and adapted to contact successively with a suitable electrode in said circuit to close the same at that point.

5. In a device of the described class, the combination of a signaling circuit, a clock mechanism, a rotary device driven thereby, and provided with a plurality of insulated circuit closing differential brushes, a dial having an annular row of perforations, a set of plugs of different lengths corresponding with the distance between the dial and the circuit closing arms,—said dial being included in said circuit and said plugs being adapted to electrically connect a contacting circuit closing arm with the dial,—a contact ring on said rotary device electrically connected with the differential brushes, and a brush connecting the source of electrical energy through the signals with said ring.

6. In a device of the described class, the combination with a signaling circuit, a clock mechanism, a dial, and circuit closing devices driven by the clock mechanism in connection therewith, of a circuit controller driven step by step from said circuit closing devices, and provided with means for directing the current through certain of said circuit closing devices to the exclusion of others, said dial having a plurality of annular rows of perforations, each adapted to receive contact plugs, and separate circuit closing devices being employed for each row of perforations in the dial, with independent electrical connections to the circuit controller.

7. In a device of the described class, the combination with a signaling circuit, a clock mechanism, a dial provided with plural rows of perforations, removable contact plugs adapted to fit the perforations, a circuit closer for each row of perforations, a carrier driven from the clock mechanism, a separate circuit closer mounted on said carrier for each row of perforations and in position for contact with plugs in such perforations, and a circuit controller mechanically driven step by step from the carrier and adapted to direct the current alternately through one of the circuit closers and then through the other.

In testimony whereof I affix my signature in the presence of two witnesses.

HARRY B. WILSON.

Witnesses:
LEVERETT C. WHEELER,
NETTIE F. DOPKE.